US008441366B2

(12) United States Patent
Buss

(10) Patent No.: US 8,441,366 B2
(45) Date of Patent: May 14, 2013

(54) DEVICE FOR ARRANGEMENT OF SENSORS FOR ELECTRONIC ACTIVATION OF A VEHICLE HATCH

(75) Inventor: Wolfgang Buss, Solingen (DE)

(73) Assignee: Huf Hulsbeck & Furst GmbH & Co. KG (DE)

( * ) Notice: Subject to any disclaimer, the term of this patent is extended or adjusted under 35 U.S.C. 154(b) by 347 days.

(21) Appl. No.: 12/838,765

(22) Filed: Jul. 19, 2010

(65) Prior Publication Data
US 2011/0012744 A1 Jan. 20, 2011

(30) Foreign Application Priority Data

Jul. 17, 2009 (DE) .......................... 10 2009 033 737

(51) Int. Cl.
*G08B 21/00* (2006.01)
*B60R 25/10* (2006.01)
*B60J 5/00* (2006.01)

(52) U.S. Cl.
USPC .............. 340/686.1; 340/426.24; 340/426.26; 340/426.29; 296/146.4

(58) Field of Classification Search ............... 340/686.1, 340/426.26
See application file for complete search history.

(56) References Cited

U.S. PATENT DOCUMENTS

| | | | | |
|---|---|---|---|---|
| 5,929,769 A | * | 7/1999 | Garnault | 340/5.61 |
| 6,441,623 B1 | * | 8/2002 | Moon | 324/661 |
| 6,759,950 B2 | * | 7/2004 | Nishimoto et al. | 340/436 |
| 7,784,855 B2 | * | 8/2010 | Faass et al. | 296/187.01 |
| 8,091,280 B2 | * | 1/2012 | Hanzel et al. | 49/25 |
| 2002/0158582 A1 | | 10/2002 | Fayt | |

FOREIGN PATENT DOCUMENTS

| | | |
|---|---|---|
| DE | 10340263 A1 | 4/2005 |
| DE | 102004060618 A1 | 7/2006 |
| DE | 102008063366 A1 | 7/2010 |
| EP | 2159362 A1 | 3/2010 |
| WO | 2005120044 A1 | 2/2005 |
| WO | 2006024399 A1 | 3/2006 |
| WO | 2006034971 A1 | 4/2006 |

* cited by examiner

*Primary Examiner* — Donnie Crosland
(74) *Attorney, Agent, or Firm* — Cantor Colburn LLP

(57) ABSTRACT

An arrangement of a sensor device with at least one sensor for a contactless activation of at least one moving part of a vehicle, especially a vehicle hatch, the sensor being arranged on at least one support element on the vehicle, in order to permit a detection of an object in at least one detection range adjacent to the vehicle, so that activation of the hatch can be activated via the detection, where the sensor is arranged in shape-mated and/or force-fit fashion on support element.

15 Claims, 3 Drawing Sheets

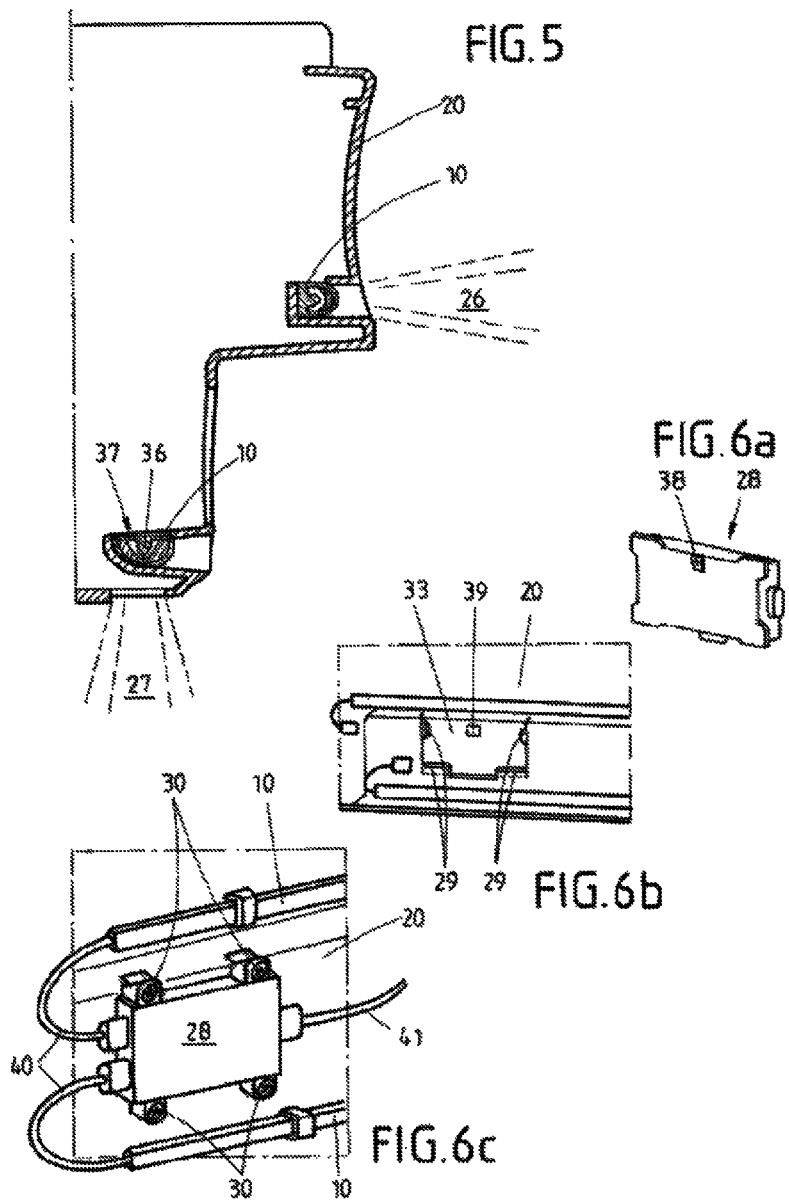

DEVICE FOR ARRANGEMENT OF SENSORS FOR ELECTRONIC ACTIVATION OF A VEHICLE HATCH

TECHNICAL FIELD

The invention is directed toward an arrangement of a sensor device with at least one sensor for contactless activation of at least one moving part of a vehicle, especially a vehicle hatch, the sensor being arranged on at least one support element on the vehicle, in order to permit detection of an object in at least a detection area adjacent to the vehicle, so that operation of the trunk lid can be activated via the detection.

BACKGROUND

Sensor devices that sense the presence, and especially movement of a person, in order to recognize the person's desire to open the moving part of the vehicle, are known for contactless activation of movable parts of the vehicle. The moving part of the vehicle can concern a hatch, and especially a trunk lid of the vehicle, movable window elements also being known, for example, a rear window movable in a trunk lid, which can then be advantageously opened or closed by a generic sensor device, if manual operation of the trunk lid is not possible or hampered. The moving part is referred to subsequently as a hatch for simplification.

The object detected by the sensor device can be a person, who is approaching the vehicle with the intention of opening the trunk. Activation of the trunk lid then describes both an opening process, for example, when the person would like to insert an object with both hands into the trunk, or activation of the trunk lid concerns a closure process of the trunk lid, when the person has removed an object from the trunk with both hands, in order to then close the trunk lid.

The sensor device then includes at least one sensor arranged on the vehicle via a support element. The sensors for trunk lid activation are usually mounted inside the bumper, so that the support element is formed by the bumper itself. It is then known to glue or laminate the sensors on the inside surface of the bumper, the sensors being designed wire-like or film-like as capacitively acting electrodes. The wires or films of sensors formed by electrodes are then applied at least over part or preferably over the entire width of the bumper of the vehicle. Consequently, activation of the trunk lid of the vehicle is possible from different areas in the immediate vicinity of the vehicle trunk. The sensors are therefore a component of the rear bumper, which are glued to the inside of the bumper or fastened to the bumper with fastening devices. It is especially known to insert the sensors already in the plastic injection molding process to produce the bumper, in order to obtain a one-part component with the molded-on sensors.

However, this produces the drawback that essential components of the vehicle, for example, the rear bumper, must be distinguished into components that have the sensor device or components that are designed without the sensor device. Consequently, a reduction in the variety of individual vehicle components is desirable.

BRIEF SUMMARY

The invention provides an arrangement of a sensor device that permits simplified arrangement of the sensor device in the vehicle. The invention also creates increased organizational flexibility for the arrangement of sensors for a sensor device in the vehicle.

The invention further provides that the sensor is arranged shape-mated and/or force-fit on the support element. This achieves the advantage that a simplified arrangement of the sensor or sensors on the support element is made possible. A shape-mated and/or force-fit arrangement of the sensor on the support element then concerns any form of arrangement that is not based on a bonded joint between the sensor and the support element and does not require the use of additional fastening elements, like screws, rivets or the like.

The present shape-mated arrangement of the sensor on the support element preferably involves a clip or snap connection that can be released again according to a further advantage. The support element can be arranged on the vehicle, in which the support element can also be a component of the vehicle. An arrangement "on" the vehicle then also includes an arrangement "in" the vehicle, for example, on the inside behind a rear bumper.

Consequently, a support element can be provided in the vehicle that can be used as the base component for any vehicle and can satisfy a function of the vehicle both without a sensor device and with a sensor device, or at least can be present in the vehicle. According to another advantage, it can be decided in a very late state of assembly of the vehicle whether a sensor device is to be provided as an additional feature of the vehicle or not, since the sensor device can be alternately introduced to the vehicle or not, without having to make a decision concerning the use of additional components.

According to an advantageous variant of the support element, it can be designed as a separately handled support module, so that the support module can be fastened as an essentially complete functional unit in and/or on the vehicle. A support module can then be based on a receptacle element, on which additional functional units, like at least one sensor, can be mounted. The support module can therefore only be mounted in a vehicle when a sensor arrangement for contactless activation of a hatch of the vehicle is also desired. If this feature is omitted on a vehicle, arrangement of the module as a complete functional unit in the vehicle can be omitted.

On the other hand, the vehicle can have a bumper and/or structural component, in which the support element can be formed by the bumper or structural component itself. Consequently, the bumper and/or structural component can be made with the corresponding functional units of the sensor device, in order to then mount them or it on the vehicle. As a result, a separate support element is not necessary, if the support element is formed by a component that is present in or on the vehicle anyway.

The sensors can preferably be designed as capacitively acting sensors, so that they have electrodes or form electrodes, on which a certain charge can be maintained by the electrical unit. If the capacitive coupling between the electrodes in the outer area of the vehicle changes, for example, by a person moving into the detection range of the sensors, the charge on the electrodes changes, which is measurable by the electrical unit. In particular, the electrical unit can have a reference charge, so that the mismatch between the reference charge, for example, in the form of a capacitor in the electrical unit, and the electrodes forms a measurable quantity of the presence of an object in the detection range of at least one sensor. In particular, an accumulation of charge in the reference capacitor can occur within the electrical unit, so that the summed charge can be converted by the electrical unit to an output signal, based on which the vehicle hatch is opened or closed.

As a result, it is sufficient to accommodate the sensors within, on or through the support element unshielded in the vehicle, if the support element and bumper do not form metallic components that cause shielding of the sensors. Consequently, the support element is preferably made from a plastic material that is produced by a plastic injection molding process according to an additional advantage of the invention. The sensors are preferably arranged on the side of the support element facing in the direction toward the bumper of the vehicle, so that the sensors are inserted sandwich-like between the support element and the bumper of the vehicle.

For shape-mated arrangement of the sensor on the support element, the support element can have at least one engagement element, via which the at least one sensor can be arranged in shape-mated fashion on the support element, in which preferably at least one engagement element is made in one part with the support element. In particular, one or more engagement elements can be designed in one part with the support element, which can be produced together with the support element in the plastic injection molding process. At least one engagement element can also be formed in one part with the support element, in which an additional engagement element can be designed as an individual part, in order to create a preferably releasable connection with the sensor on the support element. It is therefore particularly advantageous to provide a first engagement element, designed in one part with the support element, in which an additional engagement element can be provided, which is designed as an individual part and cooperates with the first engagement element of the support element, so that the sensor is arranged in shape-mated fashion on the support element.

According to another advantageous variant, at least a first engagement element can be designed as a fastening tab, which extends especially L-shaped from an extension plane of the support element. The L-shaped fastening tab can have two arms, so that the fastening tab protrudes over one of the two arms in one part in the support element. A hook-like arrangement is then formed, in which the L-shape can also be curved or uniformly bent, so that the two arms grade one into the other in a uniform curvature, and a C-shaped or G-shaped arrangement is produced.

According to a modification of the embodiment of the engagement elements, an additional engagement element can be designed as a hold-down, which protrudes from the extension plane of the support element and has a position relative to the fastening tab, so that the sensor can be arranged secure from loss between the fastening tab and the hold-down arm/support element. In particular, the hold-down can be mounted in one part on the side of the transmitting tab on the support element, so that the hold-down covers the opening side of the L-shaped fastening tab. If the hold-down is situated in an adjacent position to the fastening tab, the sensor can be mounted secure from loss between the fastening tab and the hold-down on the support element.

For this purpose, the sensor can have an elongated, preferably tube-like extent, and preferably have a flexibility designed so that the sensor can be inserted by elastic deformation introduced between the fastening tab and the mounting supports that are preferably present in duplicate. If two hold-downs are arranged adjacent to the fastening tab oppositely in the extent direction, three engagement elements are produced, so that the two hold-downs are opposite a single fastening tab. If the flexible sensor is bent so that it can be inserted between the fastening tab and the two hold-downs, the flexible sensor relaxes again into an elongated straight shape. A shape-mated connection of the sensor between the hold-downs and the fastening tab is consequently created, so that loosening of the sensor from the engagement elements is not possible without elastic deformation of the sensor again.

The support element can have a stretched shape in a width direction and be arranged in a vehicle, so that the width direction extends across the vehicle width. The support element can then preferably be integrated with parallel spacing to the bumper in the rear of the vehicle, in which a structural component can also be introduced in the rear area of the vehicle that serves to take up stronger mechanical effects on the vehicle, especially in the event of a crash. Consequently, the support element can be integrated between the structural component and the bumper of the vehicle, so that the sensors are shielded in the direction toward the outside of the vehicle only by the support element itself or at least the bumper. Since the support element and the bumper are preferably not made from a metallic material, no shielding is present between the sensors and the outer area of the vehicle, which could influence the detection range of the sensor.

Preferably, the sensor, with its elongated extent in the width direction of the vehicle, can be arranged on it, so that the sensor extends over the vehicle width, preferably in the rear area of the vehicle. The sensor can have a flexible plastic or rubber material, in which an electrode in the form of a wire, a cable or a metallic ribbon material, is integrated. The sensor can also have at least one shielding, in order to create grounding opposite the detection range of the corresponding sensor, and in order to amplify the detection range or shield against an additional detection range of an adjacent sensor. The plastic or rubber element of the sensor is then shaped, so that at least the electrode and especially the shielding are integrated in the material of the sensor.

According to another possible variant of the engagement element, it can be designed as a fastening dome, having a receptacle to accommodate the sensor. The fastening dome can also be designed for shape-mated arrangement of a clip that is designed as a mating element for the clamping arrangement of the sensor between the receptacle and the clip. The receiving cross section formed between the receptacle of the fastening dome and the clip can then correspond to the cross section of the sensor and especially the cross section of the plastic element, which represents the supporting, structure-forming part of the sensor. Several fastening domes can preferably be connected in one part with the support element, so that the fastening domes are also formed directly in the injection molding process to produce the support element. The fastening domes can then extend from the extension plane of the support element, in order to arrange the sensor at a certain spacing relative to the base structure of the support element.

If the sensor is mounted on the fastening dome, this can initially be inserted into the receptacle or fastening dome, in order to then mount the clip. The clip can have a U-shaped configuration and have barbs on its free U-arms that are designed for snapping into snap openings on the fastening dome.

The support element can have a first series of engagement elements running in its width direction and at least a second series of engagement elements running also in the width direction. The rows of engagement elements can preferably form an upper and lower row in the installed situation of the support element in the vehicle, in order to accommodate a first, upper sensor and a second, lower sensor. The two elongated sensors preferably run parallel to each other in their longitudinal extent, so that the engagement elements are preferably equally spaced relative to each other in at least one row on the support element. The sensor can therefore be mounted via several engagement elements on the support element, in which at least two engagement elements must be present, in order to create a defined arrangement of at least one sensor on the support element. In particular, the sensor can also consist of a rigid, non-flexible material, so that two engagement elements can be sufficient, in order to mount the sensor on the support element secure from loss and fixed in position.

For reliable detection of an object and preferably a person and for reliable recognition of the opening desire relative to the vehicle hatch, it can be prescribed that the upper sensor has a first detection range that is essentially designed for horizontal recording in the region next to or behind the vehicle, and in which the lower sensor has a second detection range that is designed essentially for vertical recording in the region beneath the vehicle. A person, for example, can therefore approach the vehicle, which is initially recognized by the upper sensor. If the person executes a movement beneath the vehicle with the leg, or especially foot, a sensor message by the lower sensor is added to the sensor message of the upper sensor. This can already be recognized as an opening desire relative to the vehicle hatch, in which case a specific movement pattern can be impressed on the detection of movement of the extremities by the person and recording by the sensors, in order to avoid incorrect initiation or movement of the vehicle hatch.

An ID transducer can also be provided for the operation of the sensor device according to the invention, which is effectively connected to the electrical unit or additional vehicle electronics, preferably by means of a wireless communication connection, and can communicate with it. Such ID transducers are also known as access authorization systems for a user of a vehicle and are frequently referred to as "Keyless-Go-Systems." If the user of a vehicle has such an ID transducer, this is recognized by a transmitting-receiving unit within the vehicle. Authentication of the user of the vehicle occurs on this account, so that he can open the vehicle or operate the vehicle. Positive recognition of the ID transducer and authentication of the person connected with it can then be sent to the electrical unit.

According to the invention, the control unit can be modified, so that activation of the trunk lid only occurs when the presence of an ID transducer is recognized by the electrical device and positively authenticated. For example, if the person with the ID transducer is not within the range of the vehicle, the capacitive sensors could detect the movement pattern of a person in the area of the rear bumper of the vehicle, but the control unit would not initiate opening or closing of the trunk lid.

Only in the presence of the ID transducer and a positive authentication during detection of a movement pattern by the sensors does activation of the trunk lid occur. Recognition of the ID transducers by a query can then preferably only occur, if the approach of a person is detected by the upper sensor on the support element, so that only then is the lower sensor made active, in which case the query for authentication for the person can also occur before or after the detection of the person by one or both sensors.

The initiation of the opening or closing of the trunk lid can also be made dependent on whether the vehicle is moving or stopped, in which case activation of the trunk lid is preferably only initiated when the vehicle is stopped and a speed of zero is recognized.

The support element can also be designed to accommodate an electrical unit, and especially a control unit, in which the electrical unit can preferably be arranged on the support element via receptacles that act in shape-mated fashion. A mounting plane is then provided, on which the electrical unit is positioned flat. A snapping movement is then executed, since the receptacles extend at least partially over the mounting plane. A pocket-like mounting geometry is then produced and the electrical unit can be snapped into this mounting geometry.

According to another possible embodiment for mounting the electrical unit on the support element, fastening devices can be provided, the fastening devices being preferably designed as screw elements.

BRIEF DESCRIPTION OF THE FIGURES

Additional measures that improve the invention are provided below, together with description of a preferred practical example of the invention with reference to the figures. In the figures:

FIG. 5 shows a view of a cross section through the support element with the arrangement of a first sensor for a first detection range and a second sensor for a second detection range, FIG. 6a shows a view of an electrical unit for the arrangement on the support element, FIG. 6b shows a view of a mounting plane and the assigned receptacles for the arrangement of an electrical unit on the support element, and FIG. 6c shows an arrangement of an electrical unit on a support element, fastening devices in the form of screw elements being provided for arrangement.

DETAILED DESCRIPTION

Figure 1:
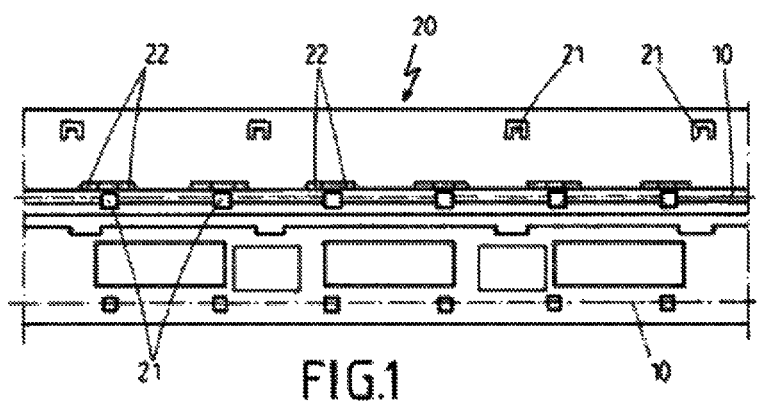
FIG. 1 shows a practical example of an arrangement of a sensor device with a support element, on which several sensors can be arranged.

FIG. 1 shows a practical example of a support element 20, as can preferably be arranged in the rear area in a vehicle. The support element 20 serves to accommodate at least one sensor 10. In the view, a first sensor 10 is completely shown in an upper arrangement and a second sensor 10 in a lower arrangement indicated with a dash-dot line. As shown in the depiction, the support element 20 has an elongated extent, so that it can extend over the width of the vehicle and can be incorporated, for example, on the inside behind the bumper in the vehicle.

For shape-mated mounting of the sensors 10 on support element 20, engagement elements are used, which are designed according to the present practical example in the form of fastening tabs 21, six fastening tabs 21 each for the upper sensor 10 and the lower sensor 10 being arranged in a corresponding row. Each fastening tab 21 is assigned to two hold-downs 22, so that the sensor 10 can be accommodated by the fastening tips 21 and the hold-down 22 in shape-mated fashion on support element 20. The shape-mated mounting of sensor 10 on support element 20 by the fastening tabs 21 and the assigned hold-downs 22 is further shown in FIG. 2.

Figure 2:
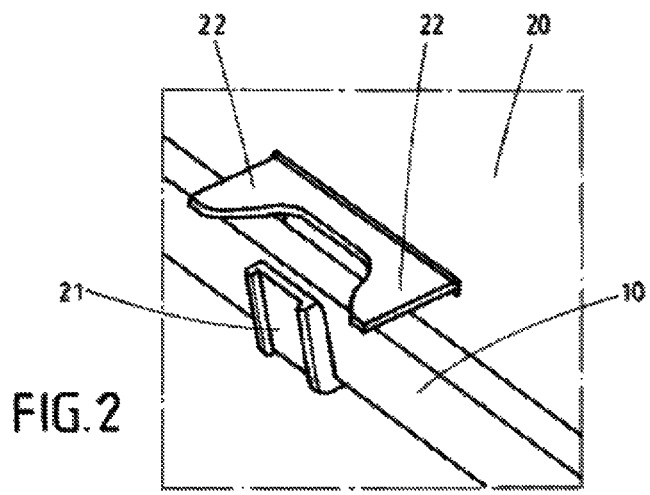
FIG. 2 shows a first practical example of fastening devices in the configuration of a fastening tab and a hold-down, which is arranged on the support element, and via which a sensor can be arranged in shape-mated fashion on the support element.

FIG. 2 shows a perspective view of the mounting of a sensor 10 on the support element 20. The support element 20 has an extent plane that runs roughly vertically. The sensor 10 also has an elongated, tube-like configuration and is accommodated on the support element 20 via a fastening tab 21 and two hold-downs 22. Both the fastening tab 21 and the hold-downs 22 are designed in one part and of uniform material with the support element 20.

For the mounting of sensor 10, it is prescribed that the sensor be elastically deformed by the installer by hand, the material of the sensor being preferably produced from a flexible substance. The hold-downs 22 are arranged adjacent to the fastening tab 21, so that the fastening tab 21 is in an L-shaped configuration between the two hold-downs 22. If the sensor 10 is now bent, so that the tube-like body of the sensor 10 can be threaded between the hold-downs 22 and the fastening tab 21, after insertion of the sensor 10 between the fastening tab 21 and the hold-downs 22, it can be relieved again. Consequently, the sensor 10, by elastic rebound, recovers its original configuration and essentially extends in a straight direction. As a result, the sensor 10 is accommodated secure from loss in shape-mated fashion between the fastening tab 21 and the hold-downs 22 on support element 20.

Figure 3:
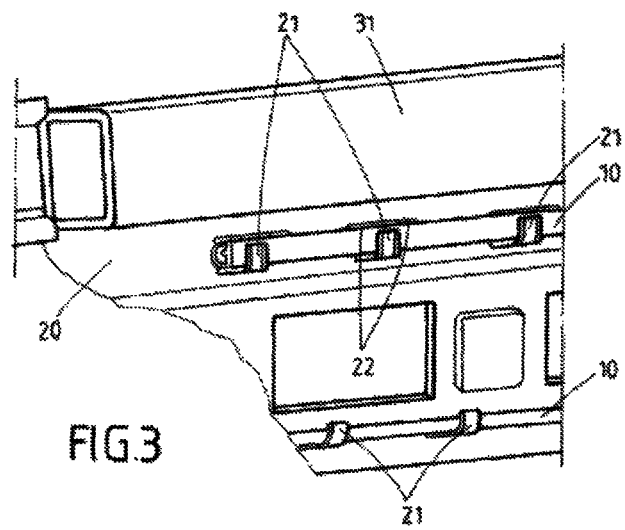
FIG. 3 shows a perspective view of the arrangement of two sensors on a support element.

FIG. 3 shows a perspective view of an arrangement of two sensors 10 on a support element 20. A vehicle element 31 is also shown, which can represent a structural component in the rear area of the vehicle. A support element 20 can then be fastened by fastening devices (not further shown) directly to this structural component 31 of the vehicle.

According to the depiction, a first sensor 10 is accommodated in an upper row of engagement elements, in which three fastening tabs 21 are shown with the corresponding hold-downs 22. Like the first sensor 10 in the upper area, an additional sensor 10 is arranged in the lower area, which is also mounted via a number of fastening tabs 21 with corresponding hold-downs 22 on support element 20.

Figure 4:
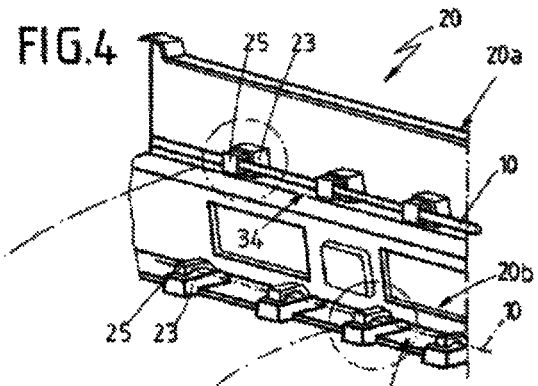
FIG. 4 shows another view of the arrangement of a sensor on a support element with an additional variant of the engagement elements.

FIG. 4 shows another practical example of the shape-mated arrangement of sensors 10 on a support element 20. According to this practical example, engagement elements are provided that are mounted in the form of fastening domes 23 on support element 20. Clips 25 can then be inserted in the fastening domes, in order to create a shape-mated arrangement of the sensors 10 on the support elements 20. The upper sensor 10 is objectively depicted, the lower sensor 10 merely being indicated by a dash-dot line. Both sensors are mounted on several fastening domes 23 on support element 20 and secured via clips 25 to the fastening domes 23. The upper sensor 10 is situated in a groove on support element 20, in which it is divided by a step 34 into an upper support area 20a and a lower support area 20b. The groove then forms between the step 34 and the support area 20a. The lower sensor 10 is then arranged on the bottom of the lower support area 20b, so that spatial separation of the two sensors is produced. The fastening domes 23 extend roughly orthogonally from the plane of the support element 20, in which an additional step 35 is present in the lower support area 20b, so that the fastening domes 23 for the arrangement of the upper sensor 10 extend roughly horizontally and the lower fastening domes 23 in step 35 roughly vertically, when the support element 20 is mounted in the vehicle. As a result, a directed accommodation of the sensors 10 is produced, in which case a detection range is assigned to each of the sensors 10 and the detection range of the upper sensor 10 radiates roughly horizontally from the support element 20, while the detection range of the lower sensor 10 radiates roughly vertically in the direction toward the ground, on which the vehicle is stopped or traveling. The arrangement of the sensors on the fastening domes 23 is more precisely shown in FIG. 4a and FIG. 4b.

Figure 4A:
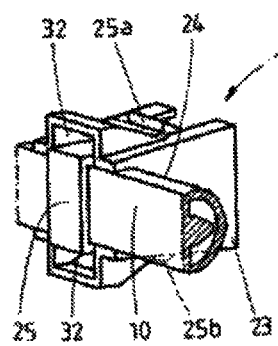
FIG. 4a shows a first view of an engagement element, which is designed as a fastening dome, and in which a clip is snapped.
Figure 4B:
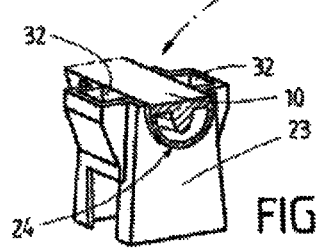
FIG. 4b shows a fastening dome according to FIG. 4a for an additional series of engagement elements for the arrangement of an additional sensor.

Fastening domes 23, each of which accommodates a sensor 10, which is shown in section, are shown in FIGS. 4a and 4b. For shape-mated arrangement of the clip 25 shown in FIG. 4a, the fastening domes 23 have snap-in openings 32. The clips 25 then have barbs 25a, 25b and have a U-shaped configuration, in order to enclose the sensor 10 during snapping of the barbs 25a and 25b into the snap-in openings 32 of the fastening domes 32, which is situated, consequently, between the clip 25 and a receptacle 24, secure from loss on fastening dome 23. For assembly, the sensor 10 can therefore be initially inserted into the receptacle 24 on the fastening dome 23, in order to then snap the clip 25 via barbs 25a and 25b into the snap-in openings 32.

FIG. 5 shows a cross-sectional view through the support element 20. An upper sensor 10 with a first detection range 26 and a lower sensor 10 with a second detection range 27 are accommodated in it, in which the sensors 10 point in the direction toward a bumper, which is situated on the right side of the support element, but not shown for simplification. According to the depiction, the sensors 10 have a specific contour, which essentially corresponds to a semicircular cross section. Roughly in the middle of the cross section of sensor 10, a sensor electrode 36 and on the back a shield 37 can be present, the sensor electrode 36 and the shield 37 being cast in a base element that forms a flexible configuration of sensor 10. By the specific arrangement of the shield 37 on the back behind the sensor electrode 36, a directed detection range 26 and 27 is produced, which act separately from each other on the support element 20 and are directed to the right and downward through the bumper (not shown). Consequently, the approach of a person to the vehicle can be detected by the detection range 26, in which movement of a body part through the detection range 27 is only recognized when the person, for example, moves his foot beneath the vehicle, in order to enter detection range 27. The sensors 10 are introduced in the corresponding engagement geometry in support element 20.

FIGS. 6a and 6b show the arrangement of an electrical unit 28 on support element 20. For this purpose, the support element 20 has a mounting plane 33, against which the electrical unit 28 can be positioned flat. Mounting devices 29 extend over the mounting plane 33. If the electrical unit 28 is initially placed flat against the mounting plane 33, in order to then move the electrical unit 28 downward in a stipulated direction in the plane of the figure, during which the electrical unit 28 slides on the mounting plane 33, the mounting devices 29 can partially enclose the electrical unit 28, so that a shape-mated arrangement of the electrical unit 28 on support element 20 is made possible. A snap-in tab 38 can snap into a snap-in opening 39 after complete displacement of the electrical unit 28 on the mounting plane 33, so that, on the one hand, the mounting devices 29 enclose the electrical unit 28 and, on the other hand, sliding out of the electrical unit 28 from engagement upward in the plane of the figure is prevented by the mounting devices 29, since the snap-in tab 38 is snapped into the snap-in opening 39.

FIG. 6c shows another possibility for an arrangement of the electrical unit 28 on the support element 20 via fastening devices 30, designed as screw elements 30. The electrical unit 28 is arranged between two sensors 10, each of which has an electrical connection 40 to electrical unit 28. According to another variant, the sensors can also have a common plug connection element for electrical connection to the electrical unit, so that a multi-pole plug-in element, for example, a 6-pole plug element, can be used. Another electrical connection 41 connects the electrical unit 28 to another electrical component of the vehicle.

The invention is not restricted to the aforementioned preferred practical example. Instead a number of variants are conceivable that make use of the presented solution even with differently configured variants. All features apparent from the claims, description or drawings and/or advantages, including design details, spatial arrangements and process steps, can be essential to the invention both in themselves and in different combinations. In particular, it should be noted that the engagement elements can be designed in different ways and the different variations combined with each other. Consequently, both a combination of fastening tabs 21 and hold-downs 22 can be provided on a support element 20, which can also be shaped with fastening domes 23 to accommodate sensors 10, or especially to accommodate only one sensor 10 on a support element 20. The support element 20 can also be designed as a bumper on the vehicle, so that the corresponding engagement elements for arrangement of the sensors inside the bumper can be present and can have an identical configuration, as shown on the separate support element 20.

The invention claimed is:

1. Arrangement of a sensor device with at least one sensor for contactless activation of at least one moving part of a vehicle, especially a vehicle hatch, the sensor being arranged on at least one support element on the vehicle, in order to permit detection of an object in at least one detection range adjacent to the vehicle, so that operation of the hatch can be activated via the detection, wherein the sensor is arranged in shape-mated and/or force-fit fashion on the support element; wherein the support element has a stretched shape in a width direction and can be arranged in the vehicle, so that the width direction extends across a vehicle width.

2. Arrangement according to claim 1, wherein the support element comprises an individually handled support module, so that the support module can be fastened as an essentially complete functional unit in and/or on the vehicle.

3. Arrangement according to claim 1, wherein the vehicle has a bumper and/or structural component, in which the support element is formed by the bumper or the structural component.

4. Arrangement according to claim 1, wherein the support element has at least one engagement element, via which the at least one sensor can be arranged in shape-mated fashion on the support element, at least one engagement element being configured in one part with the support element.

5. Arrangement according to claim 4, wherein at least a first engagement element is formed as a fastening tab and protrudes in L-shape from an extension plane of the support element.

6. Arrangement according to claim 5, wherein at least a second engagement element is formed as a hold-down, which extends from the extension plane of the support element and has a position relative to the fastening tab, so that the sensor is arranged secure from loss between the fastening tab and the hold-down.

7. Arrangement according to claim 6, wherein the sensor has an elongated, tube-like extent and has a flexibility, so that the sensor can be introduced by elastic deformation to be introduced by hand between the fastening tab and preferably two hold-downs.

8. Arrangement according to claim 1, wherein the sensor, with an elongated extent, is arranged in the width direction of the support element, so that the sensor extends over the vehicle width in a rear area of the vehicle.

9. Arrangement according to claim 4, wherein the at least one engagement element comprises a fastening dome, which has a receptacle to accommodate the sensor.

10. Arrangement according to claim 9, wherein the fastening dome is configured for shape-mated arrangement of a clip, which is configured as a mating element for a clamping arrangement of the sensor between the receptacle and clip.

11. Arrangement according to claim 10, wherein the clip has a U-shaped configuration and has barbs on free U-shaped arms, which are configured for snapping into snap-in openings.

12. Arrangement according to claim 11, wherein the support element has, in a width direction, a first row of engagement elements and at least a second row of engagement elements running also in the width direction, in which the rows of engagement elements form an upper and lower row in an installed situation of the support element in the vehicle, in order to accommodate a first upper sensor and a second lower sensor.

13. Arrangement according to claim 12,
wherein the upper sensor has a first detection range that is configured for essentially horizontal recording in a range next to or behind the vehicle, and in which the lower section has a second detection range, configured essentially for vertical recording in a region beneath the vehicle.

14. Arrangement according to claim 1, wherein the support element is configured to accommodate an electrical unit comprising a control unit, in which the electrical unit preferably can be arranged on the support element via mounting devices that act in shape-mated fashion.

15. Arrangement according to claim 14, wherein the electrical unit can be arranged with the support element via fastening devices, the fastening devices comprising screw elements.

* * * * *